(No Model.)

J. A. ROTHWELL.
GAGE FOR LATHES.

No. 314,544. Patented Mar. 24, 1885.

Witnesses
Chas. H. Smith
J. Staib

Inventor
Jos. A. Rothwell
per Lemuel W. Serrell
atty

UNITED STATES PATENT OFFICE.

JOSEPH A. ROTHWELL, OF BROOKLYN, NEW YORK.

GAGE FOR LATHES.

SPECIFICATION forming part of Letters Patent No. 314,544, dated March 24, 1885.

Application filed October 2, 1884. (No model.)

*To all whom it may concern:*

Be it known that I, JOSEPH A. ROTHWELL, of Brooklyn, in the county of Kings and State of New York, have invented an Improvement in Gages for Lathes and Boring and Planing Machines, of which the following is a specification.

In turning, boring, and planing metal great difficulty has heretofore existed in finishing the work with absolute accuracy. An article may be placed against a face-plate and turned off, and when it has been removed and measured by a micrometer it is found to be two or three thousandths of an inch too large, (more or less,) and when it is put back there is a risk of turning off too much. The same is true in the boring of holes and the turning out of cavities and recesses, for it often happens that a micrometer cannot be applied to the work while it is in the boring, turning, or planing machine in consequence of the article resting against the chuck face-plate or bed.

My invention is a micrometer-gage made with reference to attaching the same to the shears of the lathe, the rest or cross-head of the planer, or the stock of the boring-machine, so that when it has been ascertained how much of the material has to be removed the micrometer can be set to indicate the amount and to form a stop to the tool-holder when the material has been so removed.

Figure 3:
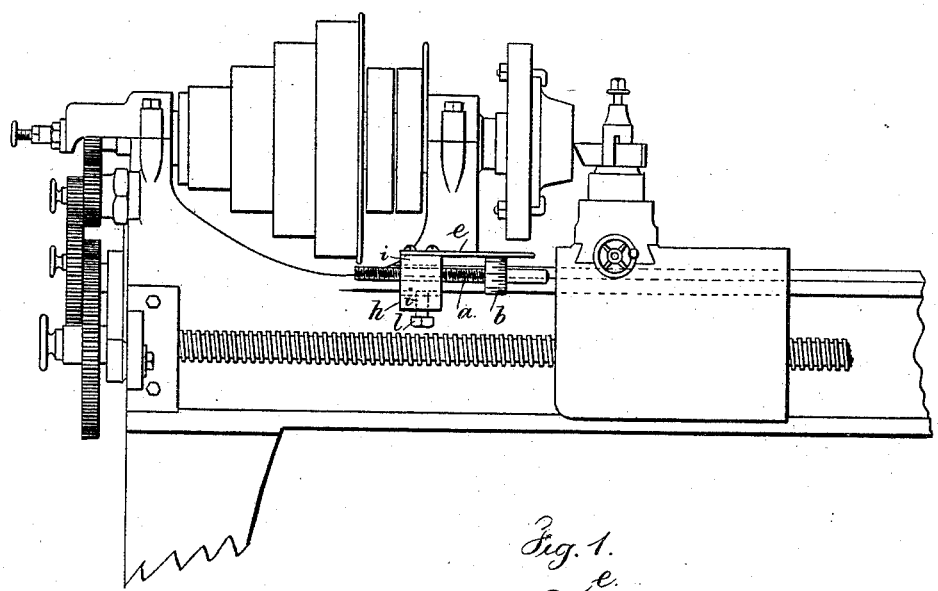
Figure 1:
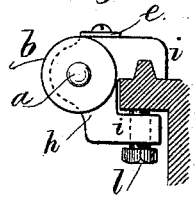
Figure 2:
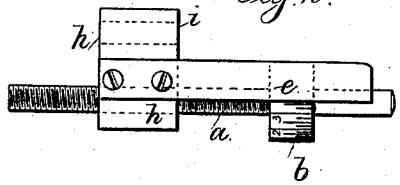

In the drawings, Figure 1 is an elevation of the gage endwise of the screw. Fig. 2 shows the gage sidewise of the screw, and Fig. 3 is an elevation representing the gage as applied to the bed or shears of the lathe.

The micrometer-screw $a$ is made with a head, $b$, upon which are the divisions in thousandths of an inch or other measurements, and at the side of the head $b$ there is the indicator $e$, having an edge that is in a plane passing longitudinally through the axis of the screw. The head $b$ with graduations is not at the end of the rod, but there is a plain projecting portion beyond the head; hence either end of the screw-rod can be used in measuring. The stock $h$ is made with the grasping jaw-pieces $i$, to catch over the shears of the lathe or the bed or stock to which the apparatus is to be applied, and $l$ is a screw by which the stock is clamped after being put in the proper position. It is now to be understood that after the article has been measured, so as to ascertain how much has to be removed, the tool-stock and tool are brought up by means of the slide-rest until the tool touches the surface that is to be acted upon by such tool. The micrometer gage is now placed so that its stock slides upon the shears or support, and it is moved thereon until one end of the micrometer-screw presses against the side of the tool-holder. The micrometer-screw is now turned back as many divisions as the article is too thick or as many divisions as have to be cut away. The workman now proceeds with the turning, boring, or cutting by the machine, in the usual manner, until the tool-holder comes into contact with the end of the micrometer-screw, which thereby becomes a stop or indicator to denote with absolute accuracy that the desired amount of material has been removed, and that hence the proper thickness has been left at the place acted upon.

It will be apparent that the micrometer-screw could be screwed into a hole at one side of the slide-rest, and the stock $h$ be upon the shears or bed, as before, the operation of the parts remaining unchanged.

I am aware that a stationary screw with nuts upon it has been used as a stop and gage to a tool-holder. This is not easily changed in position, and it is liable to become obstructed by chips and particles of metal.

I claim as my invention—

The combination of a screw-rod, having a graduated head and a plain portion extending beyond the head, with the indicator-bar and the stock adapted to be clamped to or slide upon the shears of a lathe or similar machine, so as to form a reversible stop for a tool-holder, substantially as set forth.

Signed by me this 29th day of September, A. D. 1884.

JOSEPH A. ROTHWELL.

Witnesses:
 GEO. T. PINCKNEY,
 WILLIAM G. MOTT.